United States Patent [19]
Yliknuussi et al.

[11] Patent Number: 5,875,675
[45] Date of Patent: Mar. 2, 1999

[54] APPARATUS FOR THE MEASUREMENT OF LIQUID FLOW

[75] Inventors: Matti Juhani Yliknuussi; Ari-Pekka Lyijynen, both of Kotka; Juha Tauno Paavali Karvinen, Siltakylä, all of Finland

[73] Assignee: Ecopump OY, Kotka, Finland

[21] Appl. No.: 936,575

[22] Filed: Sep. 24, 1997

[51] Int. Cl.⁶ .................................................. G01F 23/00
[52] U.S. Cl. .......................................................... 73/299
[58] Field of Search ............................ 73/299, 301, 215, 73/216; 137/576

[56] References Cited

U.S. PATENT DOCUMENTS

| | | | |
|---|---|---|---|
| 3,527,251 | 9/1970 | Bain et al. | 73/215 |
| 4,131,216 | 12/1978 | Layton | 73/215 |
| 4,928,657 | 5/1990 | Asselin | 73/299 |
| 5,639,965 | 6/1997 | Meyer | 73/216 |

FOREIGN PATENT DOCUMENTS 9636851  11/1996  WIPO.

*Primary Examiner*—Harshad Patel
*Assistant Examiner*—Jewel V. Thompson
*Attorney, Agent, or Firm*—Baker & Botts, L.L.P.

[57] ABSTRACT

An apparatus for the measurement of liquid quantity, comprising a frame (12) with a chamber space (13) inside it, an inlet duct (8) in the top part of the frame to pass a liquid into the chamber space (13), an outlet duct (11) in the bottom part of the frame to pass the liquid out of the chamber space (13) and elements (1, 2) placed in the chamber space (13) to form a weir container, said elements comprising a wall (2) and at least one orifice (1) formed in the wall, through which orifice (1) the liquid is passed out into the outlet duct (11), and means (3) for measuring the level of the liquid in the chamber space (13). The apparatus comprises means (10) for directing the liquid entering the chamber via the inlet duct (8) into at least two sub-flows (14, 15) and for directing these sub-flows from different directions to a point near the orifice (1) in the wall so that when the sub-flows (14, 15) meet again, they substantially damp the flow.

10 Claims, 1 Drawing Sheet

APPARATUS FOR THE MEASUREMENT OF LIQUID FLOW

The present invention relates to an apparatus for the measurement of liquid flow.

BACKGROUND OF THE INVENTION

In prior-art, there are solutions for the measurement of liquid flow in which a liquid channel is provided with a weir or a wall with an orifice in it to permit liquid flow through it. The rise of liquid surface caused by the weir is measured. The liquid level in the weir container is proportional to a mathematical formula of the flow rate or according to a curve obtained via calibration measurements. An apparatus of this type is presented in international patent application publication WO 96/36851. One of the drawbacks of prior-art solutions is that when the height of fall of the liquid is increased, the flow rate increases in front of the weir opening, leading to a lower accuracy of measurement.

The object of the present invention is to achieve an apparatus for the measurement of liquid flow that makes it possible to eliminate the drawbacks of prior art and to achieve a measuring apparatus that is capable of a better accuracy of measurement even in the case of a large height of fall of the liquid.

SUMMARY OF THE INVENTION

The apparatus of the invention comprises a frame with a chamber space inside it, an inlet duct in the top part of the frame to pass a liquid into the chamber space, an outlet duct in the bottom part of the frame to pass the liquid out of the chamber space and elements placed in the chamber space to form a weir container, said elements comprising a wall and at least one orifice made in the wall, through which orifice the liquid is passed out into the outlet duct, and means for measuring the level of the liquid in the chamber space. The invention is characterized in that the apparatus comprises means for directing the liquid entering the chamber via the inlet duct into at least two sub-flows and for directing these sub-flows from different directions to a point near the orifice in the wall so that when the sub-flows meet again, they substantially damp the flow. Dividing the inlet flow into two sub-flows flowing in substantially opposite directions at the orifice in the weir wall, thereby reducing the flow rate near the orifice to a level close to zero, substantially improves the accuracy of measurement. Moreover, measurement accuracy becomes independent of the height of fall above the apparatus.

The apparatus comprises means for directing the sub-flows from substantially opposite directions to a point near the orifice. The wall is of a ring-like shape so that it forms a tubular element inside the chamber space. This allows a symmetric structure that makes it possible to form substantially equal sub-flows. The orifice is implemented as a vertical slit in the wall, the slit being narrower in its upper part than in its lower part. The shape of the orifice in the weir wall can be utilised to further improve the accuracy of measurement. In the lower part of the orifice in the weir wall there is no threshold which could accumulate solids that may be present in the liquid flow, so this is another feature that improves the accuracy of measurement.

At least one guide plate guiding the liquid flow is arranged to guide the liquid flow entering the chamber from the inlet tube into the space between the ring-like wall and the interior wall of the chamber, to the opposite side relative to the orifice in the wall. With this arrangement, an advantageous solution for directing the liquid is achieved, in which the sub-flows are formed by means of the guide plate, the interior wall of the chamber and the tubular weir wall. The apparatus of the invention can be advantageously applied e.g. in discharge chutes in the wire and press section of a paper or cardboard machine, allowing an accurate flow measurement to be achieved. The apparatus can be easily installed without any major changes in the piping. In the most favourable case, only a length corresponding to the length of the meter has to be removed from the pipe, whereupon the meter is mounted in place of the removed portion.

BRIEF DESCRIPTION OF THE DRAWING

In the following, the invention will be described in detail by the aid of an example by referring to the attached drawing, in which.

DESCRIPTION OF THE PREFERRED EMBODIMENT

Figure 1:
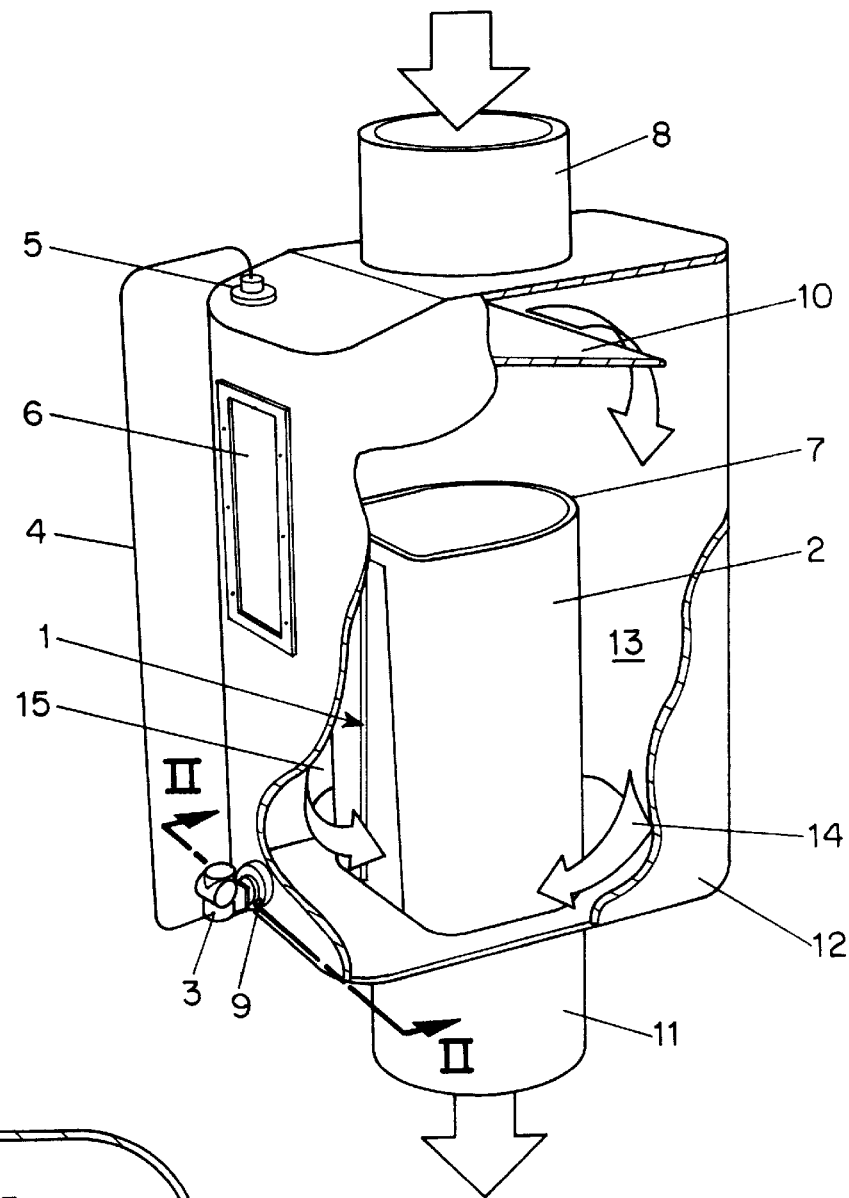
FIG. 1 presents the apparatus of the invention partially sectioned.
Figure 2:
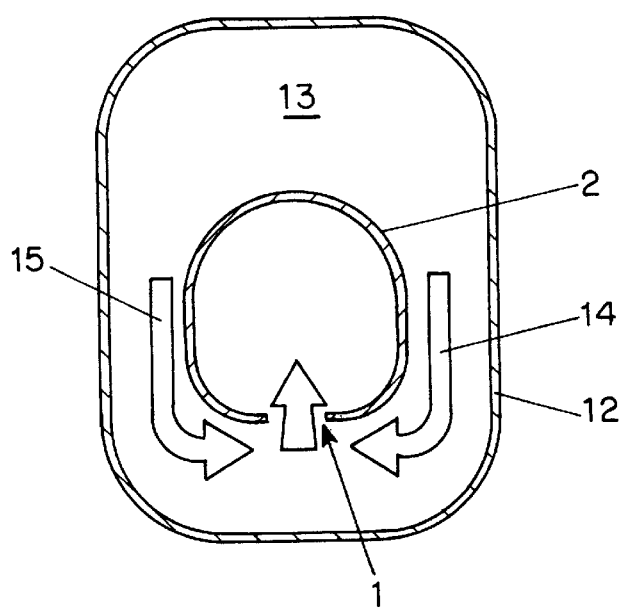
FIG. 2 presents the apparatus of the invention, sectioned along line II—II in FIG. 1.

An apparatus for the measurement of liquid quantity, said apparatus comprising a frame 12 with a chamber space 13 inside it, an inlet duct 8 in the top part of the frame to pass the liquid into the chamber space 13, an outlet duct 11 in the bottom part of the frame to pass the liquid out of the chamber space 13 and elements 1, 2 placed in the chamber space to form a so-called weir container, said elements comprising a wall 2 and at least one orifice 1 formed in the wall, through which orifice 1 the liquid is passed out into the outlet duct 11, and means 3, 9 for measuring the level of the liquid in the chamber space 13. The apparatus is based on the so-called weir flow measurement procedure, in which the liquid level in a weir container rises when the amount of incoming liquid increases. The liquid level is measured by means of a measuring device, e.g. a differential pressure transmitter. The apparatus further comprises means 10 for directing the liquid entering the chamber 13 via the inlet duct 8 into at least two sub-flows 14, 15 and for passing these sub-flows from different directions to a point near the orifice 1 in the wall 2 so that when the sub-flows 14, 15 meet again, they considerably damp the flow.

The apparatus preferably comprises means for directing the sub-flows 14, 15 from substantially opposite directions to a point near the orifice.

The wall 2 is of a ring-like shape, forming a tubular element inside the chamber space 13. The tubular wall 2 is placed in a substantially vertical position in the chamber space so that its bottom part is at the level of the bottom of the chamber space 13 while the top part extends towards the upper part of the chamber space. The orifice 1 is preferably implemented as at least one vertical slit in the wall 2, said slit being narrower in its upper part than in its lower part. At the bottom edge of the orifice 1 there is no threshold impeding the flow.

At least one guide plate 10 is provided to guide the liquid flow entering the chamber 13 from the inlet pipe 8 into the space between the ring-like wall 2 and the interior wall of the chamber 13. With respect to the orifice 1 in the wall 2, the flow is directed to the opposite side, where it is divided into at least two sub-flows 14, 15. The sub-flows 14, 15 are directed in different directions in the space between the interior chamber wall and the wall so that they meet near the orifice 1. Thus, the liquid flows from both sides of the weir wall into the orifice 1. For measurement accuracy, the flow rate should preferably be as low as possible. This is the case when the sub-flows meet near the orifice. The weir container formed between the wall 2 and the interior wall of the chamber 13 is preferably symmetrical so that the sub-flows 14, 15 remain substantially equal.

An overflow hole 7 is provided at the top of the wall. The top end of the tubular wall 2 is preferably open, so the open top will act as an overflow hole.

The liquid level is measured by means of a measuring element 3, e.g. a differential pressure transmitter. As a result of the liquid flowing into the chamber 13, the pressure in the container rises. Moreover, an underpressure condition may prevail in the inlet pipe. This leads to an incorrect measurement result. The error is eliminated by passing the pressure prevailing above the liquid column to the negative side of the transmitter 3 via a diaphragm element 5 and a connecting pipe 4.

The means for measuring the liquid level comprise a measuring element 3, placed in the weir container below the liquid surface, and a connecting pipe 4, in particular a capillary tube, leading from a diaphragm element 5 placed at a desired point in the chamber wall to the measuring element 3, so that the measuring element measures the pressure difference between these elements.

The invention functions as follows: Via an inlet pipe 8, liquid flows into the chamber 13. The liquid flow is directed by guide elements, such as a guide plate 10, to that side of the tubular wall 2 which lies opposite to the orifice 1. The liquid flow is divided into at least two sub-flows 14, 15, which flow around the tubular wall 2 and meet near the orifice 1. In the figure, the sub-flows 14, 15 are indicated by arrows. The liquid flows through the orifice 1 in the weir wall, which is accurately calibrated. The level of the liquid accumulated by the weir is measured by means of a measuring element 3, such as a differential pressure transmitter. The liquid is passed into an outlet pipe 11. The overpressure or underpressure created in the weir container is compensated from the negative side of the transmitter by means of a capillary tube 4 and a diaphragm 5 placed in the top part of the chamber. The apparatus has an overflow opening 7, through which the liquid can flow out if the weir orifice is blocked for some reason. In addition, the apparatus is provided with an inspection window/access door 6.

The apparatus of the invention can be used in numerous applications and it is especially applicable for the measurement of water quantities in paper industry, e.g. in the press and wire sections of a paper machine.

It is obvious to the person skilled in the art that the invention is not limited to the embodiment examples presented above, but that it can be varied in the scope of the attached claims.

What is claimed is:

1. Apparatus for the measurement of liquid quantity, comprising a frame with a chamber space inside it, an inlet duct in the top part of the frame to pass a liquid into the chamber space, an outlet duct in the bottom part of the frame to pass the liquid out of the chamber space and elements placed in the chamber space to form a weir container, said elements comprising a wall and at least one orifice formed in the wall, through which orifice the liquid is passed out into the outlet duct, and means for measuring the level of the liquid in the chamber space wherein the apparatus comprises means for directing the liquid entering the chamber via the inlet duct into at least two sub-flows and for directing these sub-flows from different directions to a point near the orifice in the wall so that when the sub-flows meet again, they substantially damp the flow.

2. Apparatus as defined in claim 1 wherein the apparatus comprises means for directing the sub-flows from substantially opposite directions to a point near the orifice.

3. Apparatus as defined in claim 1 wherein the wall is of a ring-like shape so that it forms a tubular element inside the chamber space.

4. Apparatus as defined in claim 1 wherein the orifice is implemented as a vertical slit in the wall, said slit being narrower in its upper part than in its lower part.

5. Apparatus as defined in claim 1 wherein at least one guide plate for guiding the liquid flow is arranged to guide the liquid flow entering the chamber from the inlet pipe into the space between the ring-like wall and the interior wall of the chamber, to the opposite side relative to the orifice in the wall.

6. Apparatus as defined in claim 1 wherein an overflow hole is provided in the top part of the wall.

7. Apparatus as defined in claim 1 wherein the weir container formed between the wall and the interior wall of the chamber is symmetrical.

8. Apparatus as defined in claim 1 wherein the means for measuring the liquid level comprise a measuring element placed below the liquid surface in the weir container, and a connecting pipe leading from a point above the liquid level in the chamber to the measuring element, so that the measuring element measures the pressure difference between the aforesaid points.

9. Apparatus as defined in claim 1 wherein the measuring element is a differential pressure transmitter.

10. Apparatus as defined in claim 8 wherein it is provided with a diaphragm element placed below the liquid surface in conjunction with the measuring element, and the connecting pipe, which is preferably a capillary tube, is provided with another diaphragm element placed at the end connecting to the top part of the chamber.

\* \* \* \* \*